H. C. DAVIS ET AL
Jan. 19, 1932. UNIT HEATING AND VENTILATING APPARATUS Re. 18,335
Original Filed June 10, 1927 3 Sheets-Sheet 1
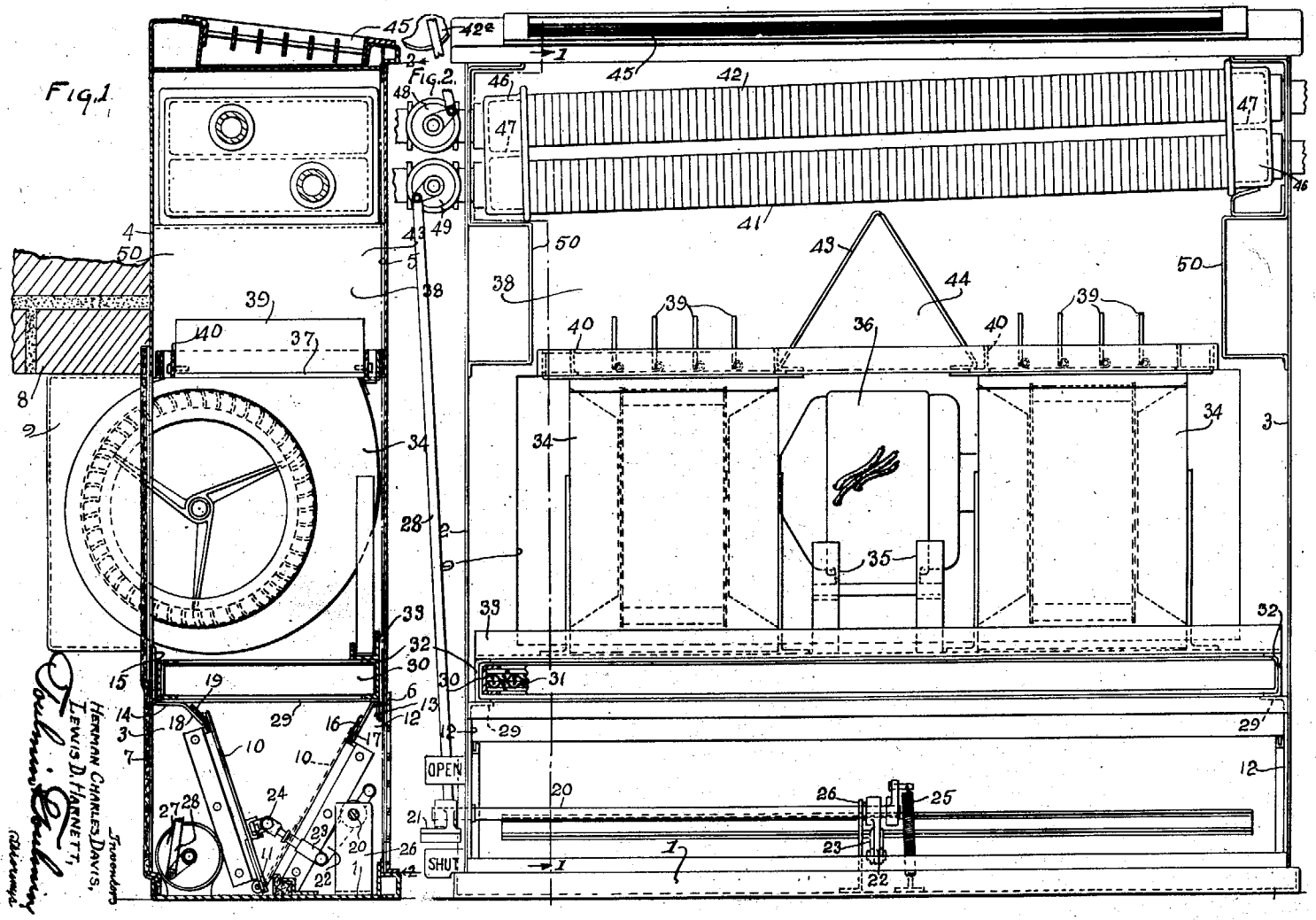
Inventors
HERMAN CHARLES DAVIS,
LEWIS D. HARNETT,
Toulmin & Toulmin
Attorneys

H. C. DAVIS ET AL

Jan. 19, 1932. UNIT HEATING AND VENTILATING APPARATUS Re. 18,335

Original Filed June 10. 1927 3 Sheets-Sheet 2

Inventors
HERMAN CHARLES DAVIS,
LEWIS D. HARNETT,
Toulmin & Toulmin,
Attorneys

H. C. DAVIS ET AL

Jan. 19, 1932. UNIT HEATING AND VENTILATING APPARATUS Re. 18,335

3 Sheets-Sheet 3

Original Filed June 10. 1927

Inventors
HERMAN CHARLES DAVIS,
LEWIS D. HARNETT,
BY Toulmin & Toulmin,
Attorneys Reissued Jan. 19, 1932

Re. 18,335

UNITED STATES PATENT OFFICE

HERMAN C. DAVIS AND LEWIS D. HARNETT, OF COLUMBUS, OHIO, ASSIGNORS, BY MESNE ASSIGNMENTS, TO BUCKEYE BLOWER COMPANY, A CORPORATION OF DELAWARE

UNIT HEATING AND VENTILATING APPARATUS

Original No. 1,749,417, dated March 4, 1930, Serial No. 197,984, filed June 10, 1927. Application for reissue filed June 15, 1931. Serial No. 544,650.

The object of our invention is to provide a unit heating and ventilating apparatus which, combined with high speed high capacity delivery, will at the same time be susceptible of control manually and automatically to prevent the ejection into the room of cold air streams.

It has been found that even though the incoming air is driven over the radiator, yet due to high speeds of delivery of the air and insufficient mixing arrangements portions of the air passing over the radiator will pass by the radiator surface so rapidly they cannot be suitably tempered, with the consequence that cold air drafts are created in the room.

It is a further object to be able to control the temperature of the room air, depending upon the temperature on the inlet side of the damper either in the bottom of the cabinet or outside of the building so that one part of the radiator is always open when the outside air temperature falls below a predetermined temperature, while it will close above that temperature. At the same time, the upper radiator continues its heating function so that the tempering radiator is only open when the temperature goes below forty degrees outside of the room.

It is a further object of our invention to provide means of controlling a tempering radiator according to the temperature of the outside air so that the tempering radiator will only be brought into operation when the temperature of the outside air falls below a certain point, while the regular heating radiator will continue its functions irrespective of the temperature of the outside air.

An additional object of great importance is the arrangement of the mechanism of this heating and ventilating unit in such a way that the dimensions thereof may be very materially reduced, thereby reducing the room that such units take, particularly in aisles, where every foot of space is essential. The crowded condition of school rooms, hospitals and office buildings, and the expensive nature of the space occupied makes it essential that the dimension from the wall to the outside of the cabinet be reduced to the minimum. This we have secured by locating the blower mechanism in a special compartment which projects to the rear of the cabinet and can be inserted in the wall of the building.

It is a further object to provide a damper and damper support, consisting of an independent frame that can be dropped into position in the cabinet, the cabinet itself being flexible so as to conform itself to the inequalities and irregularities of the building and the floor, while the frame of the damper being relatively rigid insures that the damper will properly fit against its closure strips, which are yieldingly adjustable. It is our idea to provide a flexible casing without bracing, as distinguished from the old idea of a rigid casing. It is our idea to form the casing of thin metal sheets, which are susceptible of flexing even the top plate being integral with the casing, as distinguished from the old form of a detachable top plate.

It is our object to provide a radiator in two parts with a common header, separated into a section for one radiator and a section for the other. One of these radiators is known as the heating radiator and is regulated according to the temperature inside the room, while the other radiator is known as the tempering radiator and is regulated according to the temperature outside the room.

Our invention is so arranged that the temperature at the point of location of the thermostat will open that radiator to which it is connected, while the other radiator forming a part of the system will open and close according to the temperature of the air at the thermostat which controls that radiator.

Referring to the drawings:

Figure 1 is a section on the line 1—1 of Figure 2.

Figure 2 is a section on the line 2—2 of Figure 1.

Figure 3:
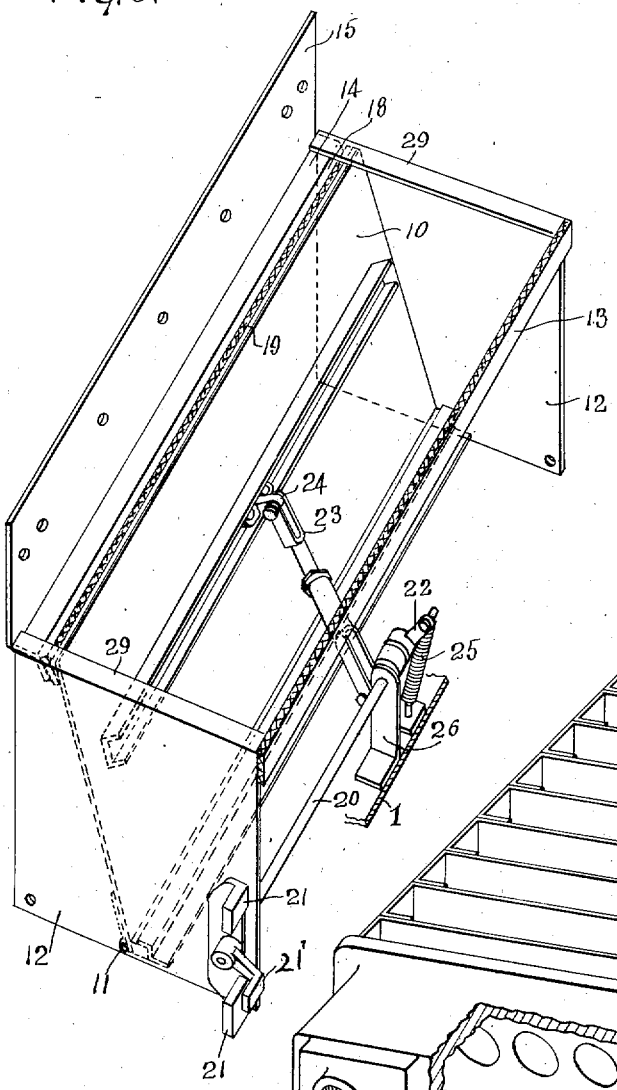
Figure 3 is a perspective of the damper and damper frame, which is adapted to be dropped in as a unit within the heating and ventilating casing.
Figure 4:
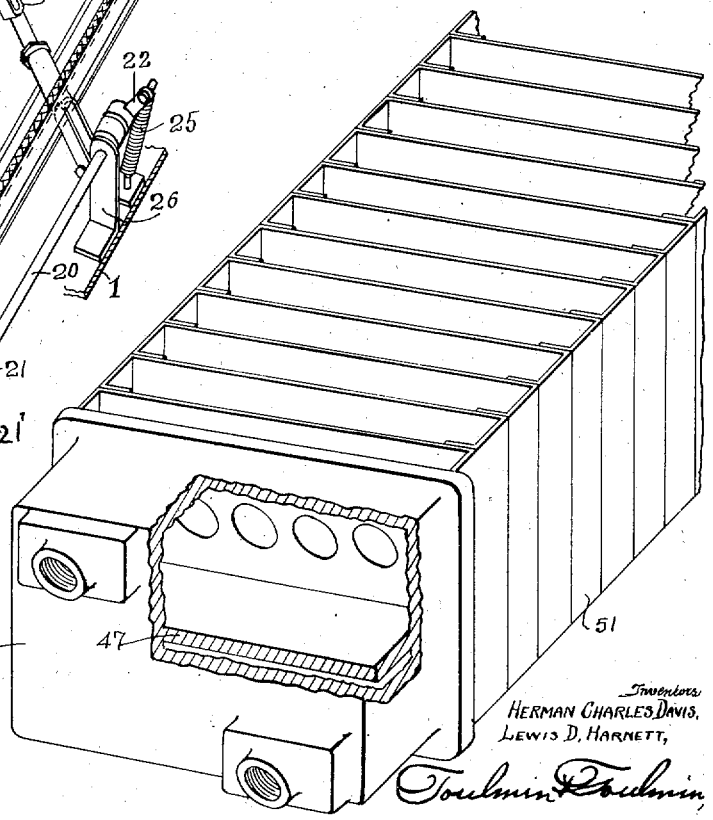
Figure 4 is a section through the joint header of the two radiators.
Figure 5:
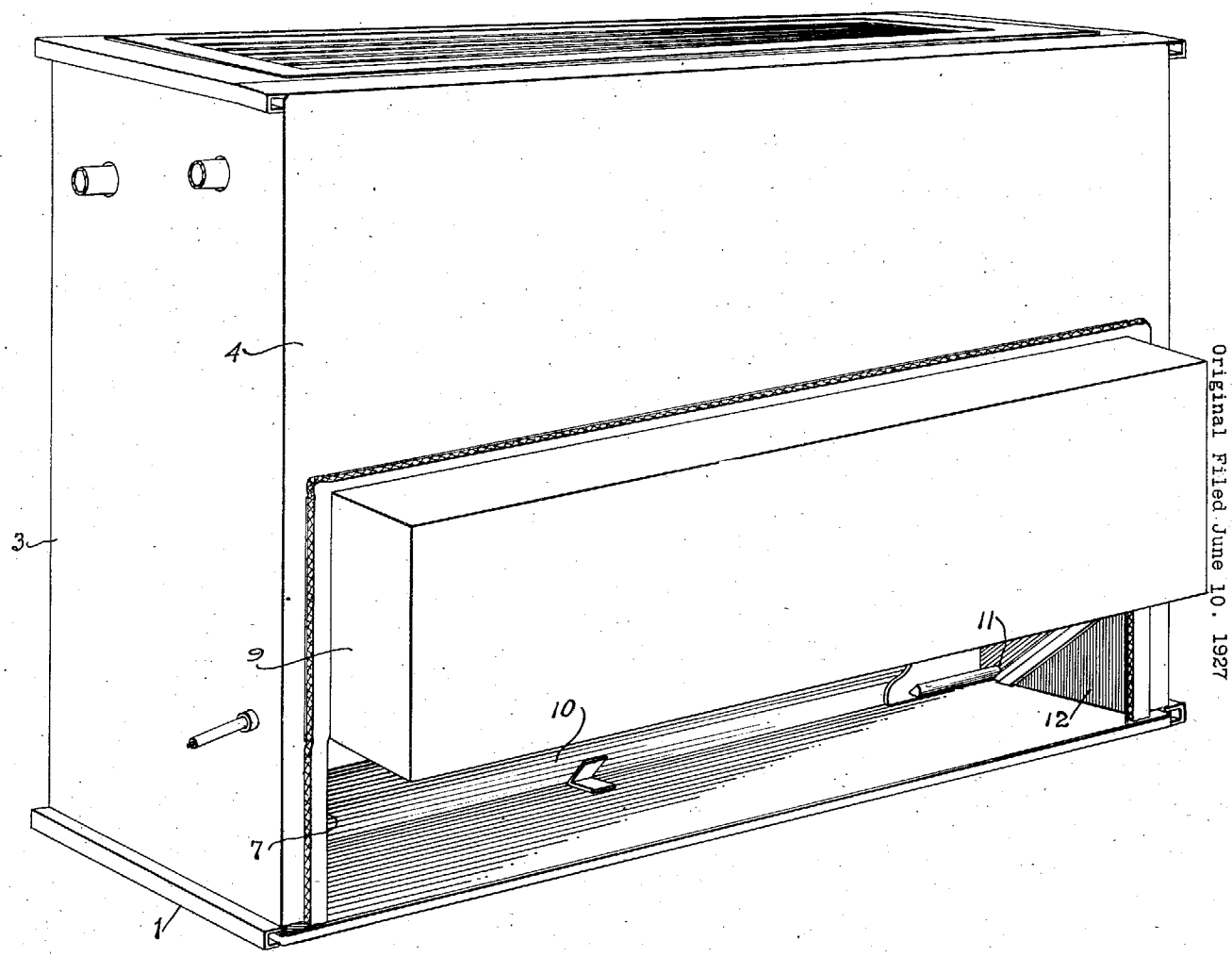
Figure 5 is a perspective of the rear of the casing.

Referring to the drawings in detail, 1 is a base plate fitted between side walls 2 and 3 and rear and front walls 4 and 5.

The front wall is provided at its lower face with an opening having a perforated grille 6, while the rear wall is provided with an inlet opening 7, which communicates with the outside of the building or wall 8 at a point above the blower projector casing 9, which projects into the wall.

The inlet opening 7 is controlled by a damper designated 10 at the bottom of the casing, 11 in the side wall and 12 on the damper frame. This damper frame consists of a pair of side walls 12, a forward connecting strip 13 and a rearward connecting strip 14, provided with an attaching plate 15. The forward strip 13 is provided with a felt 16, carried on an inwardly extending downwardly directed angularly disposed plate 17 for receiving the top of the damper. This plate is flexible and can be adjusted so that there will be a perfect fit with the damper. A similar flange plate 18 is provided on the strip 14 having a felt 19. This strip is also bendable and adjustable to receive the upper part of the damper 10.

The damper is operated by a hand-operated shaft 20, controlled by stop member 21 and a handle 21′ on the exterior of the cabinet, which shaft is connected in turn to a lever 22, attached at one end to a pitman 23, pivotally connected at 24 to the damper and connected at its other end by spring 25, to the bracket 26 which supports the shaft 20. This spring is so located that as the parts pass over the dead center the spring 25 will hold the damper in either closed recirculating position, or open inlet position.

The automatic form of operating the lower radiator consists in the location of a thermostat 27 in the inlet passageway, adjacent the incoming air, said thermostat being connected by pitman 28 with the radiator valve 49. When the air drops below forty degrees, for instance, the thermostat will open the radiator valve permitting both tempering and heating of air, whereas at all temperatures above forty degrees outside of the cabinet the lower radiator will be closed. This is an advance over the usual system of controlling the recirculation depending upon the temperature of the air of the room.

The automatic form of operating the lower radiator may also consist in the location of a thermostat 27 in the space between the two radiators 41 and 42, said thermostat being connected by a pitman 28 or other operating mechanism, with the radiator valve 49. When the air drops below 40 degrees at the point of the location of the thermostat, for instance, the thermostat will open the radiator valve permitting both tempering and heating of air, whereas at all temperature above 40 degrees at said location of the thermostat, the lower radiator will be closed.

The real problem to be solved and the real condition to be taken care of is to prevent air from entering a room which is too cold to be satisfactorily taken care of and tempered by heating and ventilating apparatus of the capacity employed. This is accomplished by the dual radiators so controlled. The heating radiator 42 may be thermostatically controlled by the thermostat 42ª in the room.

It will be noted that this frame carrying the damper is dropped into position within the casing at the bottom thereof. The inward flanges of its side members 12, such flanges being designated 29, serve to support a frame 30 or the wool filter 31, which may be of any desired character, such as woven copper wool. Mounted upon these flanges 29 are guide flanges 32 which guide the filter frame 30 and support the platform 33 on which are mounted the blower housings 34 and resilient arms 35 that support the motor 36 and its fans. The blower scroll casings 34 open at 37 upwardly to discharge their air within the mixing space 38. The entrance of the air into the mixing space 38 and the direction of its entrance is controlled by a plurality of separate, independent shutters 39 carried in a frame 40, which rests on top of the blower housings 34.

It has been found that the cold air drafts issuing from heating and ventilating apparatus arise from the failure to direct the cold air streams uniformly over the radiating surfaces of such radiators as those indicated, designated 41 and 42. The air tends to eddy between the outlet openings 37 over the motor 36 so that a cold air pocket forms in this area with no circulation through the radiator because the air is not forced to go through the radiator. This area is about one-third of the total radiation. Forcing the air to go through the entire radiator is the result of the use of the device, to be hereinafter described, and by the use of the dampers 39 we are enabled to get the full effect of our radiation and thereby increase the effectiveness of it by approximately one-third as the area heretofore cut off from tempering by the cold air pocket or stagnant air is eliminated by the use of a V-shaped metal member 43, which fits over the motor area so that the dampers 39 can direct the air making its exit through the radiator and the area 44 which was formerly occupied by cold air cannot be occupied by any of the air which is forced to travel over the sloping surfaces 43 to the radiator. We have found in actual operation that we have been able to very materially increase the effectiveness of the apparatus and to do away with the cold drafts which have heretofore been objectionable in many types of installations.

In order to still further provide for the adjustment of the heat and the air before the air passes out through the grille 45, we have provided a header of one piece, designated 46, having a dividing partition 47 so that with a single unitary header we are nevertheless enabled to provide independent controls for each radiator 41 and 42 by the valves 48 and 49. This common header provides a rigid support for the radiator structure maintaining the light non-ferrous metal radiators in proper position, properly spaced, resting upon the supports 50 formed in the casing.

In the view showing the modification of the radiator it will be observed that the vertical metal fins 51 are continuous, there being a single set of such fins for both radiators. This is desirable in the interest of strength in some installations. It also provides for continuity of flow of the air over the radiating surfaces.

It will be understood that we desire to comprehend within our invention such modifications as may be necessary to adapt it to varying conditions and uses.

Having thus fully described our invention, what we claim as new and desire to secure by Letters Patent, is:

1. In a heating and ventilating apparatus, a cabinet having an air inlet, and air exit openings, a blower, a radiator, a damper frame independent of the cabinet mounted therein, and a damper mounted on said frame, adjustable closure members adapted to engage said damper in its several positions, said members forming a part of said damper frame independent of the casing.

2. In combination in a heating and ventilating apparatus, a casing formed of metal sheets, said casing being sufficiently flexible to accommodate itself to the irregularities of the building in which it is located, a damper frame located within said casing and a damper carried thereby, said frame being rigid whereby the damper will have a rigid support, and fixed but flexible surfaces for the engagement of the damper to effect a perfect closure thereof while the casing in which the damper frame is located will be sufficiently flexible to accommodate itself to the inequalities of its support and surroundings.

3. In a heating and ventilating apparatus, the combination of a casing, a damper frame carrying a damper, said damper frame being supported on the bottom of said casing, blower housings and a blower mounted on said damper frame independent of the walls of the casing and a radiator mounted on said casing, whereby the walls of the casing are independent of the damper, damper frame, blower housings and blower and may move relative thereto while the aforementioned elements are firmly supported on the foundation of the casing.

4. In a heating and ventilating apparatus, the combination of a casing, a damper frame carrying a damper, said damper frame being supported on the bottom of said casing, blower housings and a blower mounted on said damper frame independent of the walls of the casing and a radiator mounted on said casing, whereby the walls of the casing are independent of the damper, damper frame, blower housings and blower and may move relative thereto while the aforementioned elements are firmly supported on the foundation of the casing, and a filter frame carrying a filter mounted on said damper frame.

5. In combination in a heating and ventilating apparatus, a casing having inlet and exit openings, a damper controlling said inlet opening, a blower located partially within said casing and partially exterior thereof, a supplementary rearward extending casing mounted on the main casing for accommodating the remainder of said blower, said supplementary casing being adapted to be imbedded within the wall of the building, and a radiator over the exit from said blower adjacent the exit opening of the main casing whereby the dimension of the main casing extending into the room is reduced.

6. In a heating and ventilating apparatus, a casing having an inlet opening, a damper to control said opening, a blower arranged therein for drawing air into the casing and discharging it at the top of the blower mechanism, a radiator space above said blower mechanism, and means associated with said blower mechanism for directing the air uniformly through said radiator, said means consisting of shutters and an inverted V-shaped member inclosing the area between the blower openings and leading to a point adjacent the radiator.

7. In a heating and ventilating apparatus, a casing having an inlet opening, a damper to control said opening, a blower arranged therein for drawing air into the casing and discharging it at the top of the blower mechanism, a radiator space above said blower mechanism, and means associated with said blower mechanism for directing the air uniformly through said radiator, said means consisting of shutters and an inverted V-shaped member inclosing the area between the blower openings and leading to a point adjacent the radiator.

8. In a heating and ventilating apparatus, a casing having inlet and exit openings, a damper, a blower and a pair of radiators having unitary headers divided into compartments and independent radiators connected to said compartments, independent control for said radiators, and means on said casing for supporting said radiators through said unitary headers.

9. In a heating and ventilating apparatus, a casing having inlet and exit openings, a damper, a blower and a pair of radiators having unitary headers divided into compartments and independent radiators connected to said compartments, independent control for said radiators, and means on said casing for supporting said radiators through said unitary headers, said radiators having continuous common fins for guiding the air over the radiators and supporting the radiating surfaces.

10. In combination, a casing having therein a blower, a damper and a pair of radiators for a room one a heating radiator, means for controlling said heating radiator operated by the temperature of the room, the other a tempering radiator, means in the casing for controlling said tempering radiator operated by the temperature outside of the room.

11. In a heating and ventilating apparatus for a room, a casing having a pair of radiators therein, one a heating radiator, means for controlling said heating radiator operated by the temperature of the room, the other a tempering radiator, and means in the casing for controlling said tempering radiator operated by the temperature outside of the room.

12. In a heating and ventilating apparatus for a room, a heating radiator, means controlled by the temperature of the room for regulating said heating radiator, a tempering radiator, and means inclosed by the room controlled by the temperature of the air entering the room for regulating said tempering radiator.

13. In combination, a casing having a blower and a pair of radiators therein for a room, one of which is a heating radiator and the other of which is a tempering radiator, means for controlling said tempering radiator located in the room and primarily actuated by the temperature of the air entering the room, and means in the room primarily actuated by the temperature of the air in the room for actuating the heating radiator.

14. In a heating and ventilating apparatus for a room, a heating radiator, means controlled by the temperature of the room for regulating said heating radiator, a tempering radiator, and means controlled by the temperature outside of the room for regulating said tempering radiator comprising means located inside of the room adapted to be affected by outside air and the temperature thereof as introduced into the room.

15. In a heating and ventilating apparatus for a room, a radiator, means controlled by the temperature for regulating said radiator, said controlling means being located inside the room, a tempering radiator, and means controlled by the temperature outside the room for regulating said radiator comprising a control means located inside the room and arranged to be affected by the outside air of lower temperature being introduced into the room.

16. In combination in a heating and ventilating apparatus for a room, a double radiator, separate means for controlling each of said radiators, one of said radiators being adapted for heating and the other for tempering, one of said radiators being controlled by the temperature of the air outside of the room acting upon the control means for said radiator located on the inside of the room.

17. In a heating and ventilating apparatus for a room, a heating radiator, means responsive to the temperature condition of the room for controlling said radiator, a tempering radiator, a common header for said radiators, and means within the room responsive to the temperature of the air outside the room for controlling said tempering radiator.

18. In a heating and ventilating apparatus for a room, a heating radiator, means for controlling said radiator, a tempering radiator, means for controlling said tempering radiator, and thermostatic means located in the room for controlling each of said controlling means so located that the temperature of the air adjacent each of said means will cause to be operated and controlled the radiator connected to said means according to the temperature affecting that particular thermostatic means.

19. In a heating and ventilating apparatus for a room, a heating radiator, means for controlling said radiator, a tempering radiator, means for controlling said tempering radiator, and thermostatic means for controlling each of said controlling means so located that the temperature of the air adjacent each of said means will cause to be operated and controlled the radiator connected to said means according to the temperature affecting that particular thermostatic means, one of said thermostats being in the room and subject to the temperature of the air entering the room from the outside and the other thermostat being controlled primarily by the temperature of the air in the room being heated by said radiators.

In testimony whereof we have signed our names.

HERMAN C. DAVIS.
LEWIS D. HARNETT.